US011343896B2

(12) United States Patent
Angenendt et al.

(10) Patent No.: US 11,343,896 B2
(45) Date of Patent: May 24, 2022

(54) OPTICAL-EFFECT LIGHT, GROUP OF LIGHTS, ARRANGEMENT AND METHOD

(71) Applicant: OSRAM GmbH, Munich (DE)

(72) Inventors: Guido Angenendt, Munich (DE); Norbert Haas, Langenau (DE); Norbert Magg, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/626,904

(22) PCT Filed: Jun. 29, 2018

(86) PCT No.: PCT/EP2018/067578
§ 371 (c)(1),
(2) Date: Dec. 27, 2019

(87) PCT Pub. No.: WO2019/002546
PCT Pub. Date: Jan. 3, 2019

(65) Prior Publication Data
US 2020/0116338 A1 Apr. 16, 2020

(30) Foreign Application Priority Data
Jun. 30, 2017 (DE) .................... 10 2017 211 141.0

(51) Int. Cl.
*H05B 47/19* (2020.01)
*F21V 21/15* (2006.01)
(Continued)

(52) U.S. Cl.
CPC ............. *H05B 47/19* (2020.01); *F21V 21/15* (2013.01); *G01S 17/50* (2013.01); *F21W 2131/406* (2013.01); *H05B 47/195* (2020.01)

(58) Field of Classification Search
CPC ............. F21W 2131/406; G01S 17/50; B60W 2420/52
See application file for complete search history.

(56) References Cited

U.S. PATENT DOCUMENTS

2002/0149940 A1* 10/2002 Fruhm .................... F21V 21/35 362/286
2005/0080534 A1 4/2005 Nishimura
(Continued)

FOREIGN PATENT DOCUMENTS

AT 509035 A1 5/2011
CA 2710212 A1 7/2009
(Continued)

OTHER PUBLICATIONS

International Search Report issued for corresponding PCT-Application No. PCT/EP2018/067578, dated Sep. 25, 2018, 16 pages (for informational purpose only).
(Continued)

*Primary Examiner* — Alexander K Garlen
*Assistant Examiner* — Eric T Eide
(74) *Attorney, Agent, or Firm* — Viering, Jentschura & Partner mbB

(57) ABSTRACT

An optical-effect light may include a LIDAR system for detecting objects. The optical-effect light may be controlled based on one or more parameters of the detected object. The optical-effect light may include at least one radiation source configured to emit light and at least one acquisition unit configured to acquire data pertaining to the object(s). The light may be controlled based on the acquired data.

17 Claims, 1 Drawing Sheet

(51) Int. Cl.

| | |
|---|---|
| ***G01S 17/50*** | (2006.01) |
| ***F21W 131/406*** | (2006.01) |
| ***H05B 47/195*** | (2020.01) |

(56) References Cited

U.S. PATENT DOCUMENTS

| | | | | |
|---|---|---|---|---|
| 2011/0001935 | A1* | 1/2011 | Reale | G03B 21/208 353/28 |
| 2012/0091917 | A1* | 4/2012 | Vinther | F21S 10/023 315/312 |
| 2012/0229028 | A1* | 9/2012 | Ackermann | B60Q 1/04 315/82 |
| 2012/0229033 | A1 | 9/2012 | Vaclavik et al. | |
| 2015/0016106 | A1* | 1/2015 | Belliveau | F21V 23/0435 362/233 |
| 2017/0113599 | A1* | 4/2017 | Park | B60Q 1/085 |
| 2017/0120932 | A1 | 5/2017 | Szczerba et al. | |
| 2017/0372537 | A1 | 12/2017 | Zielinski et al. | |
| 2018/0176521 | A1* | 6/2018 | Laduke | H05B 47/175 |
| 2018/0224099 | A1* | 8/2018 | Farnik | F21V 14/02 |
| 2018/0347773 | A1 | 12/2018 | Bergenek et al. | |
| 2020/0182978 | A1* | 6/2020 | Maleki | G01S 7/4817 |

FOREIGN PATENT DOCUMENTS

| | | | |
|---|---|---|---|
| DE | 602004009139 | T2 | 6/2008 |
| DE | 102016121032 | A1 | 5/2017 |
| DE | 102015224692 | A1 | 6/2017 |
| DE | 102017113441 | A1 | 12/2017 |
| EP | 0814344 | A2 | 12/1997 |
| EP | 1536248 | A2 | 6/2005 |
| WO | 2009003279 | A1 | 1/2009 |
| WO | 2010145658 | A1 | 12/2010 |
| WO | 2014174412 | A2 | 10/2014 |
| WO | 2014187717 | A2 | 11/2014 |

OTHER PUBLICATIONS

German Search Report issued for corresponding German Application No. 10 2017 211 141.0, dated Feb. 7, 2018, 9 pages (for informational purpose only).

* cited by examiner

OPTICAL-EFFECT LIGHT, GROUP OF LIGHTS, ARRANGEMENT AND METHOD

CROSS-REFERENCE TO RELATED APPLICATIONS

The present application is a national stage entry according to 35 U.S.C. § 371 of PCT application No.: PCT/EP2018/067578 filed on Jun. 29, 2018; which claims priority to German Patent Application Serial No.: 10 2017 211 141.0, which was filed on Jun. 30, 2017; both of which are incorporated herein by reference in their entirety and for all purposes.

TECHNICAL FIELD

The invention is directed to an optical-effect light, such as a group of lights having a plurality of optical-effect lights. Moreover, an arrangement having an optical-effect light and a further additional device is provided. Furthermore, a method for controlling the optical-effect light or the group of lights is also disclosed.

BACKGROUND

Optical-effect lights, which are designed as "moving head" or moving-head spotlights or have a light spot which can follow an object or a person, play a large role in the field of optical effects and shows, in particular in stage and event technology. An optical-effect light in the form of the moving head includes, for example, a base, on which an arm is rotatably fastened, which is in turn used for holding a head including a radiation source, wherein the head is held rotatably in the arm.

SUMMARY

Greatly varying light effects can be created using optical-effect lights. A control of the optical-effect lights can be performed via a central control unit. It communicates with the optical-effect lights via a digital control protocol, for example, DMX-512-A, ARTNet, or ACN. In this way, spotlight parameters can then be transmitted in a time-dependent manner by means of a light program or preprogrammed light protocol to be used in the optical-effect light to set light effects. The spotlight parameters are used, for example, for controlling a horizontal panning movement of the arm of the moving head. Furthermore, inter alia, a control of a pivot movement or of the "tilt" of the head, a control of a change of a zoom of a light exiting from the optical-effect light, a control of a selection of a mask or of gobos, a control of a setting of a light color or a brightness, or a control of a stroboscope effect can be provided using the spotlight parameters.

The optical-effect light can be used, for example, so that a light spot follows, for example, a movement of a singer or actor on a stage or a (remote-controlled) drone. Real-time position acquisition via radio is provided for this purpose in the prior art ("Local Position Measurement" (LPM)), which can be carried out in a frequency range of, for example, 5.8 GHz. The person, whose position is to be acquired, has for this purpose an emitting unit or a transponder, which can then be acquired via a stationary network of receiving stations or base stations. The data transmission for the position measurement then takes place via radio.

The receiving stations are connected to a control device, which then ascertains position coordinates of the person wearing the emitter unit therefrom. Furthermore, the control device acquires the positions of the optical-effect lights and, for example, the positions and angles of the arms and heads thereof if they are moving heads. The ascertained position coordinates of the person are then converted into control commands for the respective optical-effect lights and output thereto via a control protocol, in particular via DMX, to then control the light thereof. A control of the light of one or multiple optical-effect lights can take place for this purpose, as already noted, in such a way that one light spot or multiple light spots follow the object.

The above-explained system has the disadvantage that the person has to carry an emitter unit with them, which typically is fastened on their body. This restricts their physical mobility and a design freedom of their clothing. In addition, every emitter unit emits radiation, for example, in the gigahertz range, wherein a power range of the radiation can be, for example, 25 mW. In the case of a plurality of such devices, for example, 100 to 10 000, this can result in radiation exposure. Since the emitter unit which the person has to wear typically includes rechargeable batteries or batteries, it is conceivable that the emitter unit disadvantageously fails because of a lack of sufficient capacitance. Furthermore, the data transmission from the emitter unit to the receiving stations takes place via radio, which can be susceptible to interference.

An optical-effect light, a group of lights, an arrangement, and a method may remedy the above-mentioned disadvantages.

This object is achieved with respect to the optical-effect light according to the features of claim 1, with respect to the group of lights according to the features of claim 11, with respect to the arrangement according to the feature of claim 13, and with respect to the method according to the feature of claim 14.

Particularly advantageous designs are found in the dependent claims.

An optical-effect light is provided which has at least one radiation source. Light can be emitted using the optical-effect light, wherein a light spot can be generated, for example. The optical-effect light may include at least one acquisition unit. This unit is designed in this case in such a way that optical object-related measurements of at least one object can be provided thereby. For example, an optical distance measurement and/or optical velocity measurement and/or optical position measurement and/or optical trajectory measurement of the at least one object can be performed using the acquisition unit. The light of the optical-effect light is then advantageously controlled in dependence on the data ascertainable by the acquisition unit.

This solution has the advantage that an object, which can also be a person, or a plurality of objects, do not have to be known beforehand, since in contrast to the prior art, they do not have to include, for example, an emitter unit or transponder. This is particularly advantageous for events in which the public or other objects which are not previously known are also to be incorporated. Therefore, a significant simplification can be enabled in the illumination and/or tracking of persons using an optical-effect light. Such an optical-effect light can also operate autonomously and does not necessarily have to be dependent on a central control unit for the tracking regulation, for example.

In a further design, it can be provided that the measurement(s) of the acquisition unit is/are performed optically via radiation of at least one emitter unit. The emitter unit is, for example, an infrared (IR) laser diode or a laser diode which can emit IR beams or IR laser beams or laser beams.

Furthermore, the acquisition unit can advantageously include a receiving unit for acquiring the reflected radiation, wherein the reflected radiation is based on the emitted radiation.

For example, the acquisition unit is a light detection and ranging (LiDAR) system. LiDAR systems are used, for example, in the automotive field for partially autonomous or completely autonomous driving. In this case, a relative distance of an external object in relation to the ego vehicle, or also a relative velocity and trajectory of another vehicle, in particular with respect to the ego vehicle, are then measured.

The acquisition unit can be attached fixed in place, for example, on a stationary part, in particular a base, of the optical-effect light. Alternatively, it is conceivable to attach the acquisition unit to a movable part, for example, a head or a lamp head, of the optical-effect light. In the latter case, it is provided that a current position and alignment of the acquisition unit attached to the movable part is taken into consideration, in particular via a data analysis unit, to be able to carry out an accurate distance measurement, for example, to an object.

The radiation of the acquisition unit is used in a defined measurement range or "field of view". The acquisition unit or the measurement range is/are, for example, fixed in place or stationary or movable or variable. Alternatively or additionally, it can be provided that the radiation can be pivoted or rotated in a defined angle range and/or the radiation is rotatable around 360°. The acquisition unit furthermore has, for example, a mirror for deflecting the radiation. The mirror can then be rotatable to rotate the radiation in an angle range or around 360°. Surroundings can thus be scanned by means of the mirror or scanning mirror, for example, a MEMS mirror (micro-electromechanical system). The mirror can be a part of a microsystem or form part of a microsystem technology, respectively. The acquisition unit acquires the position and/or the trajectory or the movement path of the at least one object via a runtime measurement method or via a "time-of-flight (ToF)" method. A runtime measurement method is explained, for example, together with an optimization of a signal-to-noise ratio in the document CA 2 710 212.

The acquisition unit or the LiDAR system may thus include an emitter unit for IR radiation, which can be generated by IR laser diodes and can have a wavelength of, for example, 905 nm, and a receiving unit or a sensor for reflected IR radiation.

In a further design, it is conceivable that an irradiation area which can be irradiated by the radiation of the acquisition unit is settable. Thus, for example, a light spot on an object can advantageously be adapted. In other words, a LiDAR irradiation area or a LiDAR window for the optical-effect light can be individually settable. This can be performed, for example, via an optics adaptation or via an adjustment of the mirror or via a scanning mirror position or by a rotation of the radiation source.

In a further design, the optical-effect light may include a data analysis unit. An object recognition is advantageously executable thereby. The data analysis unit includes in this case, for example, an algorithm for improving the signal-to-noise ratio. The data analysis unit can recognize an object, for example, from a point cloud, which was acquired by the acquisition unit. The object recognition via the data analysis unit is performed, for example, via computation, in particular by a so-called blob acquisition, and/or by a database query, for example, by the data acquired by the acquisition unit being compared to a database. The database can be provided internally or externally for this purpose. In the case of a blob acquisition, regions of identical structure can be acquired, which then define an object or a subregion of an object.

If the at least one object is acquired and/or detected, an object classification can thus be performed to then simply control the optical-effect light, for example, in dependence on the object class. Multiple object classes are provided in the object classification, wherein an acquired object is then classified into one of the object classes, in particular by the data analysis unit. This has the advantage that the data analysis unit does not have to re-identify objects every time. For a respective object class, one predetermined light effect or multiple predetermined light effects can then advantageously be provided. For example, nonmoving objects can be provided for a first object class, in particular over a defined timeframe. A nonmoving object is, for example, a stage prop or a musical instrument (drum) or a loudspeaker wall. These objects are immobile and can receive a so-called "object frame" after the assignment or classification. Furthermore, a second object class can be provided, which is provided for objects which move within a defined circle or sector or radius—proceeding from the optical-effect light, for example—wherein the object can then be, for example, a musician or guitar player. Furthermore, a third object class can be provided, which is provided for movable objects which move in a larger movement radius or larger radius or larger circle or larger sector in comparison to the second object class. Of course, still further object classes can be provided. The data analysis unit can thus be used for object detection and object classification.

In a further design, the optical-effect light includes a control unit and/or is connectable to a control unit. Control commands or movement commands for controlling the light and/or for controlling the optical-effect light can then be output via the control unit or via the respective control unit in dependence on the data transmitted from the acquisition unit and/or from the data analysis unit. If the optical-effect light has a separate control unit, it is thus advantageously possible that the optical-effect light can carry out an object determination and object tracking autonomously, whereby, for example, a central external control unit does not have to be utilized. An autonomous operating mode then advantageously does not require data transmission, in particular for the object detection and analysis, and a control unit provided remotely from the optical-effect light. If the optical-effect light is additionally connectable to an external control unit, the optical-effect light is thus flexibly usable, since in an alternative operating mode it can then also be centrally controlled, in particular temporarily, wherein, for example, a light program can be activated, in particular in the optical-effect light. Thus, for example, the control of the optical-effect light can be performed via an external control unit and the object determination and object tracking can be performed autonomously by the internal acquisition unit and/or by the internal data analysis unit and/or by the internal control unit. In particular in the case of rapid object movements, the autonomous operating mode of the optical-effect light is advantageous, since the data computation and/or the data interpretation and/or the data analysis and/or the alignment of the light can be performed more rapidly, since the computed control does not have to be performed via a central control unit. Especially for outdoor applications, an autonomously functioning optical-effect light is advantageous. An autonomously operating optical-effect light, in particular without central or external control unit, is also advantageous for private indoor applications in particular, for example, home entertainment, since in this way an installation and operating expenditure can be kept low.

The control unit or an additional monitoring unit can advantageously monitor the functionality of the optical-effect light. A defect or fault of the optical-effect light can thus be detected, for example, and an error message can be output, for example.

In one embodiment, a prediction unit can be provided. Using this unit, an, in particular future, position and/or trajectory of the at least one object can then be predicted, in particular based on the data ascertained by the acquisition unit and/or by the data analysis unit. This has the advantage that the light of the optical-effect light can already radiate on a future position of the at least one object or leads the object, or tracking of the object takes place accurately in time. An object position in the future can thus be computed or predicted with a probability-weighted accuracy.

In a further design, a processing unit can be provided. This unit can then ascertain or compute the position and/or the trajectory and/or the distance—in particular to the optical-effect light—and/or the velocity of the at least one object on the basis of data ascertainable by the acquisition unit and/or on the basis of data ascertainable by the data analysis unit.

The control unit and/or the data analysis unit and/or the prediction unit and/or the processing unit and/or the monitoring unit is/are integrated, in particular directly, into the optical-effect light, in particular into a housing of the optical-effect light, and/or attached to the optical-effect light, in particular on a housing of the optical-effect light, and/or connected via signal transmission, in particular wireless signal transmission, in particular via a server or via a cloud, to the optical-effect light. If an external connection of the optical-effect light to a control unit is provided, the at least one external control unit can thus form an optical-effect light arrangement with the optical-effect light. The applicant reserves the right to direct an independent or dependent claim onto the optical-effect light arrangement. Furthermore, it is conceivable that one or multiple of the mentioned units are provided both internally and also externally.

The control unit and/or the data analysis unit and/or the prediction unit and/or the processing unit and/or the monitoring unit forms/form a control device or a control panel.

At least one object to be illuminated can then be defined using the control unit, in particular based on the data of the data analysis unit and/or the prediction unit and/or the processing unit.

In a further design, a data memory can be provided, in particular a nonvolatile data memory. Data acquired by the acquisition unit and/or data ascertained by the data analysis unit and/or control commands or data generated by the control unit and/or data ascertained by the processing unit can then be stored via this data memory. The data memory is provided, for example, integrated into the optical-effect light or on the optical-effect light or externally. It is thus also conceivable to integrate one data memory and to provide a further data memory externally.

In other words, an optical-effect light equipped with a LiDAR system is provided, which is capable of measuring autonomously moving and nonmoving objects and/or the position and velocity parameters thereof and of analyzing and/or detecting them by means of a data analysis unit, wherein then a distance, a movement, and a trajectory are ascertainable.

The measurements, computations, and the data communication takes place extremely rapidly, in particular within nanoseconds or microseconds.

The optical-effect light includes a housing, in which or on which the control device is integrated or arranged.

In a further design, the control unit controls the optical-effect light in such a way that its light follows at least one object, in particular follows or leads it.

The light of the radiation source can be imaged as a projected spot or light spot, whereby an object can be illuminated in a defined manner.

The control unit can control the light of the optical-effect light via the control commands in such a way that light effects can be formed. Light effects can be a function of a parameter or a parameter set. They can thus be dependent on one or multiple parameters. One parameter or multiple parameters can be selected from the following parameters: position and/or trajectory and/or distance and/or velocity of the at least one object acquired by the acquisition unit; distance of a first object from a second object and/or from a third object and/or from a further object, wherein the distance can be acquired via the acquisition unit; soundwave, in particular tone, sound, complex sound, song, song selection; predetermined event, in particular an event selection, for example, a basket during a basketball game; volume; time parameter; event parameters; time clocking; feedback signal from an auditorium.

The control commands which can be output by the control unit can be part of a control program or light program. Providing a plurality of, in particular predetermined, control programs is conceivable. These can then be a function of one or the parameter or of one or the parameter set. The selection of a control program is thus in dependence on the parameter or the parameter set. One or multiple of the above parameters can then be provided as the parameter or as the parameter set. A defined control program or light program can thus be used for a defined light effect. The control programs can then be triggered in this case in dependence on the mentioned time and event parameters. The control program or one of the control programs is thus, in particular first, selected and/or triggered, in particular then, by one parameter or multiple parameters. The control program or the control programs can be stored on one or the data memory. Retrievable control programs can thus be stored in the, in particular autonomously operating, optical-effect light. It is also conceivable that one control program or multiple control programs are provided for one or for one respective object class. The corresponding control program—or the corresponding control programs—can then be associated with an acquired object upon its assignment to an object class.

In other words, the control commands of the control unit can be used so that the optical-effect light follows or leads the object with its light or its light spot, in particular in the case of a position prediction, but also to generate desired light effects.

The position and/or the design and/or the shape and/or the angle of the light emitted by the optical-effect light can advantageously be known and/or acquired, in particular for the object tracking, wherein this is reported to the control device or the control unit, in particular via a control protocol.

Coordinates of an acquired object or a part of the acquired objects or all acquired objects are stored and/or represented in a diagram, or a Cartesian or three-dimensional polar coordinate system, in particular for the object tracking. Therefore, in particular for the object tracking, coordinates of one or all objects can be represented in a coordinate diagram. The coordinates of the acquired object or a part of the acquired objects or all objects can then be defined in reference to the optical-effect light or to a part of the optical-effect lights if a plurality of optical-effect lights is provided, or to all optical-effect lights, if a plurality of optical-effect lights is provided. The shortest distance to the optical-effect light or to the optical-effect lights can thus be ascertained in a simple manner. It can thus be established that for the object tracking which can be controlled by the control unit, a current position and angle of the optical-effect light and the coordinates of at least one object to be tracked or tracked are provided.

The coordinates of the acquired object or a part of the acquired objects or all objects can be in reference to at least one object point or marking cross which is established and/or detectable by the acquisition unit. It is also conceivable to set the coordinates in reference to an optical axis of the optical-effect light or to an intersection of optical axes of optical-effect lights.

In a further design, it can be provided that after the object detection and/or object classification by the data analysis unit, at least one detected object is definable which is illuminated using the light. The deviation of the position or the coordinates of the at least one object to be illuminated and the position or the coordinates of the light spot or the possible light spot can be ascertained by the processing unit. The light or the light spot can then be tracked via the control unit in such a way that the distance between the position or the coordinates of the object to be illuminated and the position or coordinates of the light spot is reduced or is 0 or is essentially 0. In other words, after the object classification and definition of the object to be illuminated, a deviation of the object coordinates from the coordinates of a possible light spot can be ascertained and the optical-effect light can be tracked accordingly. Alternatively, a deviation from the intersection of the optical axis of the optical-effect light with the object, for example, the object base point or an object center of gravity or an object eye level can be provided as the deviation. The coordinates can thus be defined for at least one object or for a part of the objects or for all objects, specifically in reference to one or all optical-effect lights if multiple optical-effect lights are provided, and/or in reference to a defined object detectable by the acquisition unit, for example, a marking cross. In reference to one or all optical-effect lights can mean that the shortest distance to the optical-effect light itself and/or to an intersection of optical axes of optical-effect lights is ascertained.

It can thus be established that for every detected object, position coordinates and movement parameters are known, measurable, and computable and are storable in a data memory. The light or the light spot of the optical-effect light can then move toward the computed target coordinates in accordance with the trajectory and/or the velocity of the object.

In a further design, it is conceivable that a change of the at least one object or of objects can be acquired using the acquisition unit. The change can be, for example, a position change and/or a velocity change and/or a change of a height above the ground and/or a change of the shape of the object. If the object is a person, for example, the raising of an arm can be acquired or in general a change of the posture or a change of a position of limbs.

With acquisition of the position change of the at least one object, a difference determination of the current position from the preceding position of the at least one object via the processing unit can be enabled. The light can then be tracked based thereon by control via the control unit to follow the at least one object.

As already at least partially stated above, the acquisition unit can acquire movable and/or stationary objects. The optical-effect light is used in stage technology. It is also conceivable that the optical-effect light, which can be designed as a LiDAR-based security light, is used for object monitoring. It can then be used, for example, for burglary protection or for personal monitoring, since it can react autonomously, as stated above, even without control by an external control unit.

A group of lights having a plurality of optical-effect lights according to one or multiple of the preceding aspects is provided. A part or all thereof can advantageously exchange data in this case, in particular wirelessly or via a wired connection. The optical-effect lights can thus exchange data and coordinate by means of direct, in particular wireless communication, whereby the illumination of objects is improved. The respective control of the light of a respective optical-effect light can thus be based on the exchanged data or additionally on the exchanged data. Since all or a plurality of optical-effect lights can be equipped with an acquisition unit or a LiDAR system, advantageously many objects can be measured, detected, and tracked, in particular from identical or different spatial angles.

In a further design, it is conceivable that one of the optical-effect lights is provided as an assignment light. It can assume the analysis of the data, in particular its own and the transmitted data, and/or can assume the control of a part of the optical-effect lights or all optical-effect lights, via its control device or via an external control device. In other words, the data can be exchanged between the optical-effect lights and an assignment light, in particular provided and configured for this purpose, can then provide the data analysis unit and/or control unit for the object fixation of a respective optical-effect light.

The assignment light can control a part of the optical-effect lights or all optical-effect lights in such a way that the optical-effect light which is closest to an acquired object illuminates and/or tracks this object. The at least one optical-effect light or a part of the optical-effect lights or all optical-effect lights which have had an object to be illuminated and/or tracked assigned by the assignment light can then illuminate and/or track the assigned object or the respectively assigned object autonomously or independently. The autonomous illumination and/or tracking takes place, for example, over a predetermined timeframe, which is variable in particular. At least one optical-effect light or a part of the optical-effect lights or all optical-effect lights which have had an object to be illuminated and/or tracked assigned by the assignment light can therefore additionally have a predetermined timeframe allocated by the assignment light. In other words, the optical-effect lights can receive an object bond and then autonomously track it, at least for a certain time.

In a further design, it is conceivable that a part of the optical-effect lights or all optical-effect lights jointly illuminate or track an object.

In a further design, an identity number can be allocated to at least a part of the acquired objects or every acquired object, wherein this is performed in particular via the assignment light. It is conceivable that the data for a respective object are represented and/or stored as object data points in a data space. It is thus conceivable that the assignment light represents the object data points in a data space and can thus allocate an identity number to every object, which can then be used for the object bond.

In a further design, the irradiation areas of the acquisition units of the optical-effect lights can be identical or different.

A defect and/or fault, for example, a failure of the acquisition unit, of an optical-effect light, can be reported, in particular via this optical-effect light, to the assignment light and/or to a control device and/or to an external control device. In the case of the defect of the acquisition unit of an optical-effect light, one object or multiple objects can no longer be acquired thereby, wherein then the assignment light and/or the external control device uses the acquisition unit of another optical-effect light to acquire the object or the multiple objects. The acquired data of the other optical-effect lights can then be provided to the optical-effect light having the defective acquisition unit.

In a non-limiting embodiment, an arrangement having at least one optical-effect light according to one or multiple of the preceding aspects or having a group of lights according to one or multiple of the preceding aspects is provided. In this case, data of the optical-effect light or part of the optical-effect lights or all optical-effect lights can be used for controlling at least one additional device, in particular an item of stage equipment. The device is, for example, one camera or multiple cameras which can then track the at least one acquired object in synchronization with one optical-effect light or multiple optical-effect lights. If multiple cameras are provided, the camera can thus be activated which is closest to the object or has the best viewing angle. Activation can mean that the camera is selected for a live transmission in television. Alternatively or additionally, one microphone or multiple microphones can be provided as the device. Turning up and down the sensitivity or other parameters of the microphone or the microphones can then be performed in dependence on the position of the at least one acquired object. Furthermore, a stage inventory can be provided as the device, which is then controllable. The stage inventory is, for example, a curtain and/or another object and/or a loudspeaker and/or a video installation.

In a non-limiting embodiment, a method is provided for an optical-effect light according to one or multiple of the preceding aspects or for a group of lights according to one or multiple of the preceding aspects having the following steps:

- acquiring a distance and/or a velocity and/or a position and/or a trajectory of at least one object via the acquisition unit,
- computing the position and/or the trajectory and/or the distance and/or the velocity of the at least one object on the basis of the data acquired by the acquisition unit via the processing unit and/or detecting the at least one object via the data analysis unit,
- generating control commands for controlling the light in dependence on the data computed by the processing unit and/or ascertained by the data analysis unit via the control unit.

The light can be controlled using the control commands in such a way that object tracking of the at least one object is performed.

The optical-effect light can, for example, be wirelessly connected to the control device and/or the optical-effect light includes the control device. If an external control device is provided, in a first operating mode, the optical-effect light having its integrated acquisition unit can thus transmit the acquired data to the central and external control device, which can then carry out the object detection and determination of the position and trajectory of the object and can subsequently generate control commands which can then be returned to the optical-effect light, in particular via data protocol, and this light can thus be controlled thereby. Furthermore, a second operating mode can be provided if the optical-effect light includes the control device, since it can then autonomously track an object. The control device of the optical-effect light can then carry out the object detection and position determination and thereupon generate control commands for the object tracking and/or for possible light effects, in particular by difference determination of the current object position from the prior one. If an optical-effect light has a control device and can additionally be connected to an external control device, both operating modes are thus advantageously executable.

In a further design, in particular in a third operating mode, it can be provided that the optical-effect light is firstly controlled by the external control device and then receives a control command for autonomous control, in particular from this external control device, wherein the optical-effect light can then be controlled using the internal control device. An alignment of the light on the at least one object can then be performed via the internal control device and/or a tracking of the at least one object using the light can be performed via the internal control device. A third operating mode can thus be provided, in which the optical-effect light is firstly centrally controlled and then, using a so-called "autonomous control command", can automatically align itself on the moving object and track it.

The control programs are provided on the data memory integrated into the optical-effect light. They can then, for example, be able to be executed and started by the external control device.

BRIEF DESCRIPTION OF THE DRAWINGS

In the embodiments and figures, components which are the same or of the same type, or which have the same effect, are respectively provided with the same references. The elements represented and their size ratios with respect to one another are not to be regarded as to scale. Rather, individual elements, in particular layer thicknesses, may be represented exaggeratedly large for better understanding.

DETAILED DESCRIPTION

Figure 1:
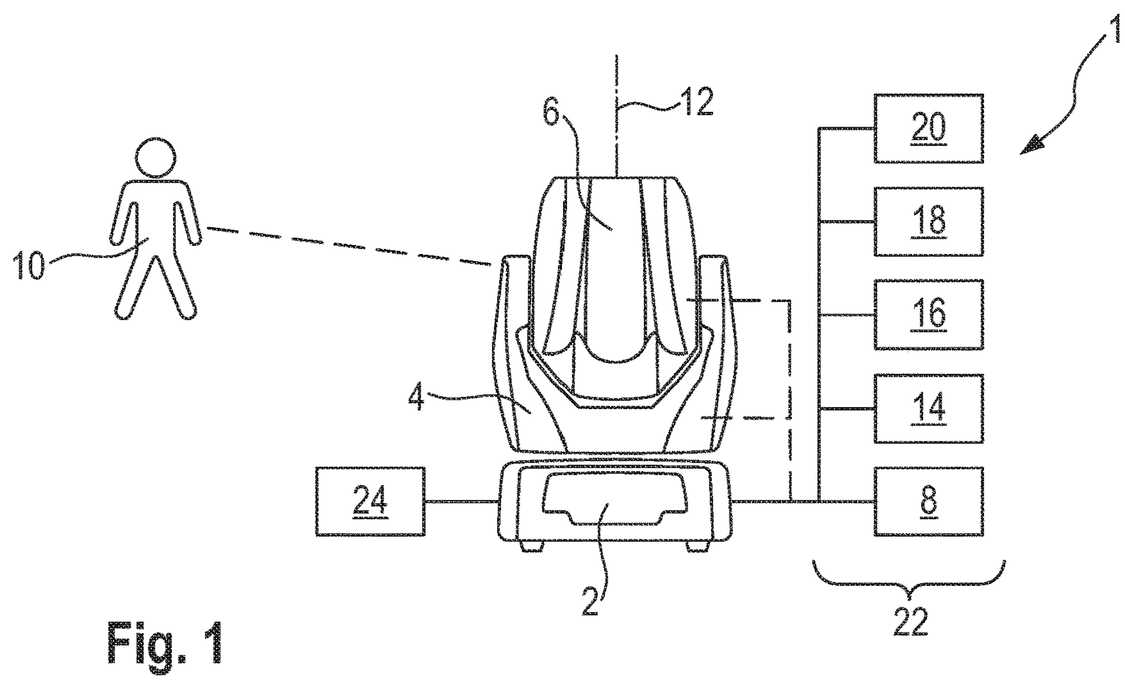
FIG. 1 shows a schematic illustration of an optical-effect light according to one embodiment.

An optical-effect light 1 is illustrated greatly simplified according to FIG. 1. It is designed as a moving head and has a base 2, on which an arm 4 is rotatably arranged, which encloses a head 6 having a radiation source in a forked shape, wherein the head 6 is rotatable in relation to the arm 4. An acquisition unit in the form of a LiDAR system 8 is integrated into the optical-effect light 1. This system can be attached in/on the stationary base 2 or in/on the movable arm 4 (identified by a dashed line) or in/on the movable head 6 (identified by a dashed line). Using this system, an optical position and trajectory measurement of an object 10, which is a person, for example, can be carried out. The optical-effect light 1 or a light 12 exiting from the optical-effect light 1, which is schematically shown by a dashed line in FIG. 1, can then be controlled in dependence on the data ascertainable by the acquisition unit. For this purpose, a data analysis unit 14 is provided, which analyzes the data acquired by the LiDAR system 8 and carries out an object detection and object classification on the basis thereof. A control unit 16 can then control the optical-effect light 1 and/or the light 12 based on the data of the data analysis unit 14. Furthermore, a prediction unit 18 is provided, using which a future position and/or a future trajectory of the object 10 is predictable. Moreover, the optical-effect light 1 includes a processing unit 20, which then computes the position and trajectory of the object 10 on the basis of the data acquired by the LiDAR system 8. The units 8 and 14 to 20 can form a control device 22. The data acquired, generated, and computed via the control device 22 are storable on a data memory 24.

Figure 2:
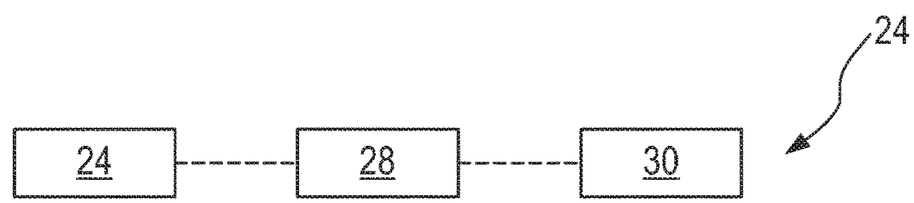
FIG. 2 shows a schematic illustration of a group of lights according to one embodiment.

According to FIG. 2, a group of lights 24 is provided, which includes three optical-effect lights 26, 28, and 30. They can each be designed, for example, according to the optical-effect light 1 from FIG. 1. The optical-effect lights 26 to 30 communicate wirelessly and exchange data in this case, which is illustrated by the dashed line in FIG. 2. The left optical-effect light 26 in FIG. 2 is used in this case as an assignment light. It can then additionally or alternatively or partially assume the control functions for the optical-effect lights 28 and 30. Moreover, the optical-effect light 26 as the assignment light can assume the analysis of the data acquired by the optical-effect lights 26 to 30.

Figure 3:
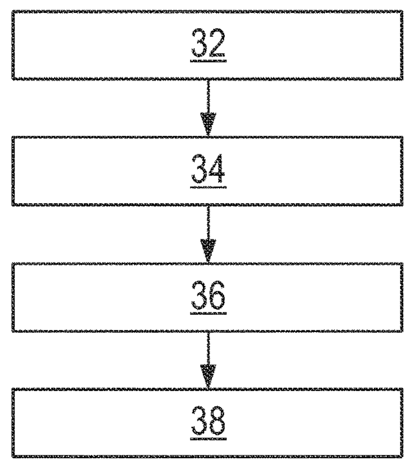
FIG. 3 shows a flow chart of a method for the optical-effect light or the group of lights.

According to FIG. 3, a method for controlling the optical-effect light 1 from FIG. 1 has a first step 32, in which a position and a trajectory of the object 10 are acquired via the LiDAR system 8, see FIG. 1. In the following step 34, the position and trajectory of the object are then computed on the basis of the acquired data by the processing unit 20. In subsequent step 36, the object detection is then performed via the data analysis unit 14. In step 38, the optical-effect light 1 is then controlled to accordingly via the control unit 16 based on the data computed by the processing unit 20 and ascertained by the data analysis unit 14.

It can be stated that an optical-effect light is provided which is also equipped with a LiDAR system for object measurement. The optical-effect light can furthermore be equipped with a data analysis unit for object detection and classification. Moreover, the optical-effect light can have a control unit for object tracking. It is conceivable that the optical-effect light having its control unit is used for autonomous object tracking. Alternatively or additionally, the optical-effect light having the control unit can be provided for autonomous and/or central object tracking. If a group of optical-effect lights is provided, it is thus conceivable to design a group controller. The group of optical-effect lights or the optical-effect light can also be used with an independent controller thereof.

An optical-effect light is disclosed which has a LiDAR system for acquiring objects. The optical-effect light can then be controlled in dependence on the acquired object.

LIST OF REFERENCE SIGNS optical-effect light 1; 26, 28, 30
base 2
arm 4
head 6
LiDAR system 8
object 10
light 12
data analysis unit 14
control unit 16
prediction unit 18
processing unit 20
control device 22
group of lights 24
step 32 to 38

The invention claimed is:

1. An optical-effect light comprising:

a head comprising at least one radiation source configured to emit light;

a base comprising at least one acquisition unit configured to acquire data pertaining to one or more of optical distance measurement, velocity measurement, position measurement, trajectory measurement, or combinations thereof of at least one object; and a data analysis unit configured to detect the at least one object and classify the at least one object as a moving or non-moving object;

wherein the at least one acquisition unit is a light detection and ranging (LiDAR) system;

wherein the light is controllable based on the classification of the at least one object as a moving or non-moving object wherein the optical-effect light is configured to control at least one additional device comprising stage equipment, a camera, a microphone, a stage inventory, and combinations thereof based on the data.

2. The optical-effect light as claimed in claim 1, further comprising a control unit configured to output commands to control the light based on the object classification.

3. The optical-effect light as claimed in claim 1, further comprising a prediction unit, configured to predict a position and/or a trajectory of the at least one object.

4. The optical-effect light as claimed in claim 1, further comprising a processing unit configured to ascertain one or more of the position, trajectory, the distance, a velocity, or combinations thereof of the at least one object based on the data ascertained by the at least one acquisition unit.

5. The optical-effect light as claimed in claim 1, wherein optical-effect light is configured to communicate via signal transmission with one or more of a control unit, a data analysis unit, a prediction unit, a processing unit, or combinations thereof.

6. The optical-effect light as claimed in claim 2, wherein the control unit is configured to control the optical-effect light in such a way that the light follows the at least one object.

7. The optical-effect light as claimed in claim 2, wherein the control unit is configured to control the optical-effect light with control commands in such a way that the light can be formed into light effects.

8. The optical-effect light as claimed in claim 7, wherein the light effects are a function of one or more parameters.

9. A group of lights having a plurality of optical-effect lights as claimed in claim 1, wherein at least a portion of the plurality of optical-effect lights exchange data.

10. The group of lights as claimed in claim 9, wherein one of the optical-effect lights is an assignment light configured to analyze the data and/or configured to control at least one or more further optical-effect lights of the plurality of optical-effect lights.

11. A method for an optical-effect light as claimed in claim 1 comprising:

acquiring one or more data corresponding to a distance, a velocity, a position, a trajectory, or combinations thereof of the at least one object with the at least one acquisition unit, determining the distance, the velocity, the position, the trajectory, or combinations thereof of the at least one object based on the data acquired by the at least one acquisition unit, generating control commands for controlling the light, using a control unit, based on the data determined.

12. The method as claimed in claim 11, wherein the optical-effect light is configured to be first controlled by an external control device but then the optical-effect light receives a control command for autonomous control, wherein the optical-effect light is then controlled by an internal control device.

13. An arrangement comprising one or more optical-effect lights of claim 1; and the at least one additional device.

14. The arrangement as claimed in claim 13, wherein the at least one additional device is an element selected from the following group: stage equipment, stage inventory, a camera, a microphone, a stage curtain, a loudspeaker, a video installation, or combinations thereof.

15. A method for controlling an optical-effect light of claim 1; wherein the method comprises:

controlling the optical-effect light by an external control device;

receiving a control command for autonomous control; and controlling the optical-effect light by an internal control device.

16. The optical effect light as claimed in claim 1, wherein the at least one acquisition unit comprises a micro-electro-mechanical system (MEMS) mirror to assist the acquisition unit in acquiring the data.

17. The optical effect light as claimed in claim 1, wherein the at least one additional device is additionally controllable based on the classification of the at least one object.

* * * * *